July 1, 1958

J. P. STEIBEL 2,841,021

EXPANSIBLE PULLEY

Filed June 11, 1956

INVENTOR:
JAMES P. STEIBEL
BY *Arthur J. Hansmann*
ATTORNEY

July 1, 1958 J. P. STEIBEL 2,841,021
EXPANSIBLE PULLEY
Filed June 11, 1956 2 Sheets-Sheet 2

INVENTOR:
JAMES P. STEIBEL
BY Arthur J. Hansmann
ATTORNEY

United States Patent Office 2,841,021
Patented July 1, 1958

2,841,021

EXPANSIBLE PULLEY

James P. Steibel, Racine, Wis.

Application June 11, 1956, Serial No. 590,592

11 Claims. (Cl. 74—230.17)

This invention relates to a pulley and V-belt combination, and, more particularly, it relates to expansible pulleys of the centrifugal force operable type.

It is an object of this invention to provide an expansible pulley which automatically governs its pitch under the influence of both the speed and torque on the pulley. In accomplishing this object, centrifugal force weights retained by springs render the pulley responsive to speed, while a means of automatically locking the weights in a set position permits the pulley to transmit a high torque regardless of speed. By control of the tension on the V-belt, the weights can thus be either locked in position or they can be released to permit the pulley to vary its effective diameter.

Another object of this invention is to provide a centrifugal force type expansible pulley which is simple and inexpensive but yet accurate and efficient in its operation.

A further object is to provide a centrifugal force operated pulley wherein the centrifugal force weights pivot about pins disposed parallel to the pulley axis. In this object, the force of inertia of the centrifugal weights on their pins is not effective to cant the pins and thereby bind them in their mountings as is the tendency where the pins are transverse to the pulley axis.

Still a further object is to provide a centrifugal force type of pulley wherein tension on the pulley belt causes the pulley to decrease its effective diameter rather than have the centrifugal force weights cause the diameter to decrease.

Other objects and advantages will become apparent upon reading the following description in light of the accompanying drawings, wherein.

Similar reference numerals refer to similar parts throughout the several views.

Figure 1:
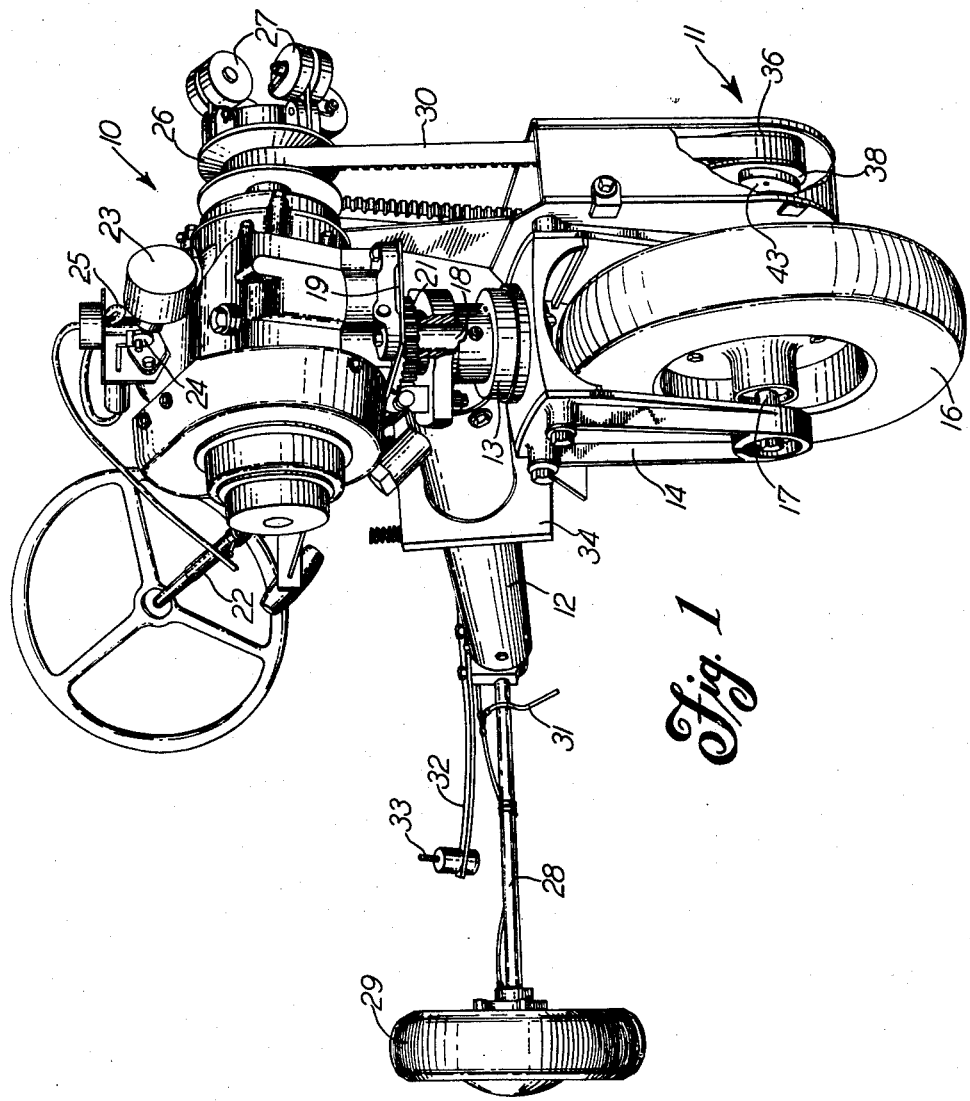
Fig. 1 is a front perspective view, with parts broken away and parts removed, of a tricycle vehicle employing a preferred embodiment of the pulley and V-belt combination of this invention.

The pulley and V-belt combination of this invention has been found to be particularly useful in the transmission of power for a road vehicle. Therefore, in order to fully describe the structure and its new function, brief reference to a road vehicle will be made. Fig. 1 shows a tricycle vehicle 10 which is particularly designed for road, golf courses, delivery functions, and the like, and the design specification included economy in both manufacture and operation. The pulley and V-belt combination 11 is shown on the vehicle 10 and a following part of this description will explain the particular application of the combination 11 to the vehicle 10.

The vehicle 10 includes a frame piece or pipe beam 12 disposed in the longitudinal direction of the vehicle, and the vehicle body has been removed. The forward end of the beam 12 has a socket or bearing 13 attached thereto for support on a fork 14 which rotatably receives a front wheel 16 and an axle or shaft 17. It will be noted that a post 18 is received within the bearing 13 to connect to the fork 14 at the lower end of the post and to a plate 19 at the upper end of the post. Also, a gear 21 is mounted on the post, and it should be obvious that the post is rotatable in the bearing 13, and the fork 14, the plate 19, and the gear 21 rotate with the post. Of course, the gear 21 is meshed with a gear on the lower end of the steering column 22. A gasoline engine prime mover 23 is suitably mounted on the plate 19 with its throttle 24 at the top thereof and a fragment of a flexible connector 25 is shown attached to the throttle and it extends into the body to be controlled by the driver. It will also be noted that a pulley 26 of the centrifugal force influenced type is mounted on the side of the engine with pivotal weights 27 attached to the pulley for causing it to increase its effective diameter upon increased speed of rotation, except for a factor described later in regard to the pulley 11. The usual pulley V-belt 30 is disposed on the pulleys 11 and 26.

Completing the general description of the vehicle chassis, the rear end of the pipe 12 has a spring axle 28 attached thereto and extending laterally on both sides of the pipe 12. The outer ends of the axle 28 each carry a rear wheel 29 which includes a brake mechanism, not shown. A fragment of a flexible connector 31 is secured to the chassis and the connector, of course, extends into the vehicle body for control by the driver. A flat spring 32 is attached to the rear end of the pipe 12 and extends to both sides thereof for supporting the rear of the vehicle body at the connectors 33. The front of the vehicle body would be supported on a block 34 mounted near the front end of the pipe 12.

Figures 2, 3:
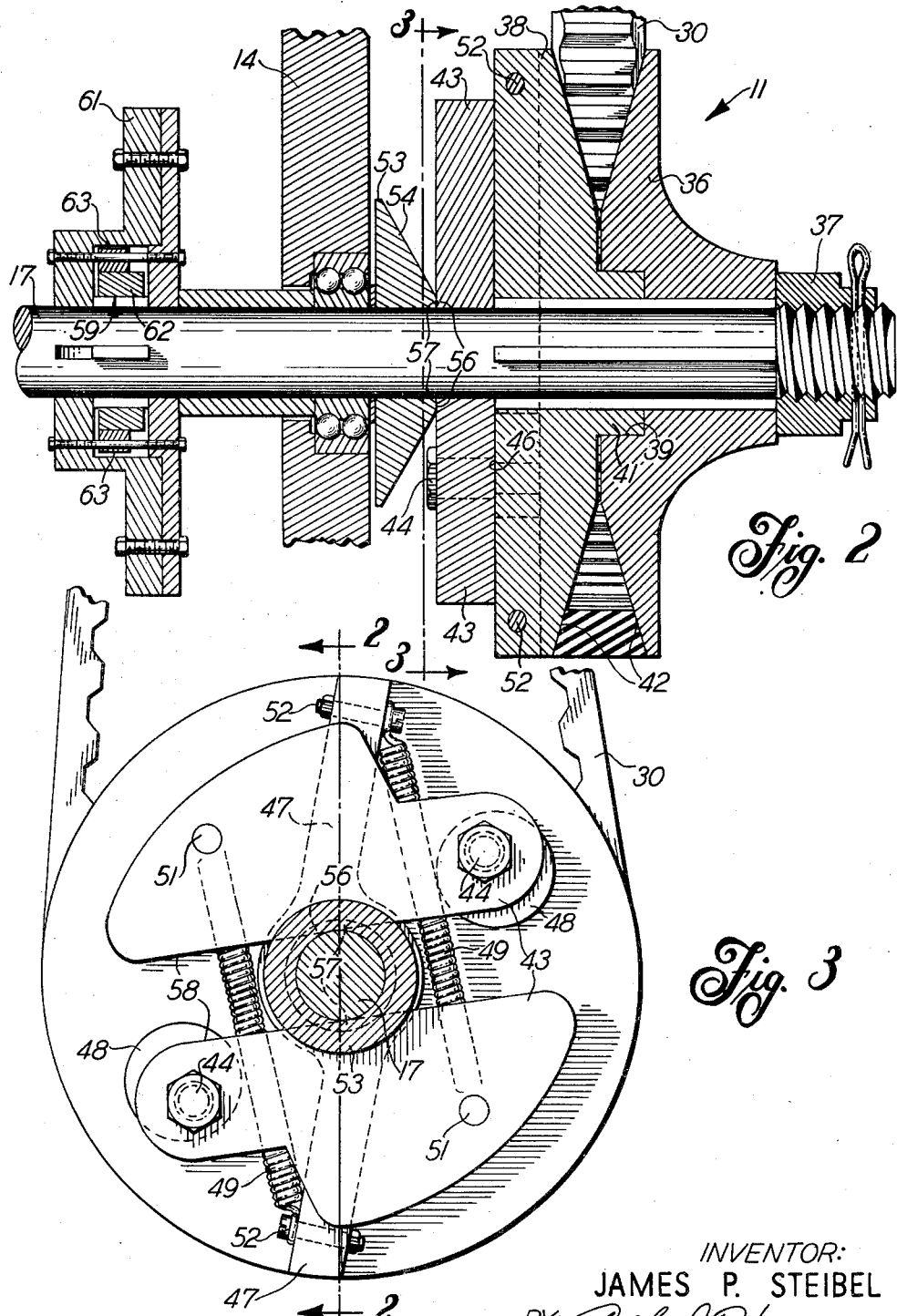
Fig. 2 is an enlarged sectional view of the pulley shown in Fig. 1 and taken on the line 2—2 of Fig. 3.
Fig. 3 is a sectional view taken on the line 3—3 of Fig. 2.

With the foregoing description in mind, reference is now made to Figs. 2 and 3 which show the detail of the pulley 11. The shaft 17 has splined or keyed thereto a pulley half or section 36 which may be considered to be axially fixed to the shaft 17. A nut 37 secures the pulley half 36 to the shaft. Another pulley half or section 38 is similarly splined or keyed to the shaft 17 but is axially movable on the shaft. The pulley halves 36 and 38 have a socket 39 and a hub 41, respectively, which mate to insure pulley alignment. Also, the usual beveled annular surface 42 is formed on each pulley half to define the usual V-belt receiving groove.

The side of the pulley half 38 opposite the belt groove side pivotally supports a pair of weights 43 on pivot bolts 44 having their axes parallel to the shaft 17. Of course, the bolts 44 are shouldered at 46 to avoid clamping the weights 43 against ribs 47 on the pulley half 38. Also, bosses 48 are provided on the pulley half 38 for mounting the pivot bolts and the weights. With this arrangement, the weights 43 pivot radially outwardly under the influence of centrifugal force and in a plane parallel to the plane of the pulley groove, and, since the pivot axis of the weight is transverse to the pulley groove, the force of inertia of each weight 43 opposing the rotation of the pulley is transverse to the pivot axis of the weight. A tension coil spring 49 is connected to each weight 43 at pins 51 and to the pulley half 38 by bolts 52 on the ribs 47. Of course, the springs urge the weights 43 radially inwardly in opposition to centrifugal force acting on the weights.

An important feature of this invention is the provision of an abutment or frusto-conical member 53 concentrically mounted on the shaft 17 to be axially fixed but rotatably free on the shaft. It will be noted that the apex of the member 53 is toward the pulley 11 and, of course, an inclined surface 54 and an abutment or shoulder 56 are on the member 53. Further, with the member 53 being adjacent the weights 43, the shoulder 56 is shown in contact with the edges 57 of weights which can be forced against the shoulder 56 by driving tension on the V-belt 30. The weights 43 are thus clamped in the position shown in Figs. 2 and 3 and, regardless of the pulley R. P. M., the weights will not pivot radially outwardly to allow the belt 30 to wedge between the pulley halves and decrease the pulley effective diameter. Without the function of holding the weights and, consequently, the pulley half 38, the latter would be moved axially away from the pulley half 36 in decreasing the effective diameter of the pulley 11.

The latter feature is particularly useful on the vehicle 10 when it is desired to have the greatest torque, such as when under maximum loads of starting, going up an incline, and the like. This is comparable to low gear in a conventional automobile. Since the pulley 11 cannot expand, the pulley 26 cannot contract as the V-belt 30 prevents this, and, regardless of the R. P. M. of the pulleys, the power transmission remains in low gear. However, merely by momentarily relieving the throttle 24, the belt tension is relaxed sufficiently to release the weights 43 from their clamped position as centrifugal force could then be great enough to cause the weights to pivot radially outwardly and free of the shoulder 56.

The weight edges 58, which are then adjacent the surface 54, can contact the surface 54 as the centrifugal force and the springs 49 determine the extent of the radially pivoted positions of the weights, and, in combination therewith, the V-belt 30 determines the axial movement of the pulley half 38. Thus, the belt tension spreads the pulley halves while the spring tension resists the axial movement of the pulley half 38 by urging the weights against the inclined surface 54 and thereby causes the pulley 11 to remain tight with the V-belt and eventually to close to the Fig. 2 position when belt tension is sufficiently relieved.

It is preferred that a conventional over-running clutch 59 be provided on the wheel hub 61 to permit the vehicle to coast free of the resistance of the engine 23. In this instance, a clutch ratchet 62 is shown keyed to the shaft 17 while pawls 63 are pivotally mounted on the hub to be engaged by the ratchet when the shaft is driven and thereby drive the wheel, and to pivot past the ratchet when the wheel is coasting faster than the ratchet is rotating.

While a specific embodiment of this invention has been shown and described, it should be obvious that certain changes could be made therein, and the invention should, therefore, be limited only by the scope of the appended claims.

I claim:

1. In an expansible pulley of the type operable with a V-belt and influenced by centrifugal force weights, the combination of a rotatable shaft, a pair of pulley halves mounted on said shaft for rotation therewith and one of said pulley halves axially movable on said shaft, said pulley halves including facing beveled surfaces for defining a V-shaped pulley groove therebetween with said V-belt received in said groove, a weight pivotally attached to said one of said pulley halves on the side thereof opposite said groove for movement radially outwardly of said shaft on an axis parallel to said shaft and upon rotation of said pulley, a spring attached between said weight and said one of said pulley halves for urging said weight radially inwardly toward said shaft, means adjacent said weight for retaining the latter radially inwardly and axially with respect to said shaft when tension on said V-belt urges said one of said pulley halves axially and for releasing said weight to have said pulley halves spread apart when centrifugal force acts on said weight and said tension on said V-belt is relieved.

2. In an expansible pulley of the type including axially movable and opposed pulley halves defining a groove therebetween for receiving a V-belt whereby tension on the latter urges one of said pulley halves in one axial direction, the combination of a centrifugal weight pivotally attached to said one of said pulley halves on the side thereof opposite from said V-belt, a spring attached to said weight and anchored on said one of said pulley halves for yieldingly urging said weight against centrifugal action, a member mounted for abutting engagement with said weight on the side thereof opposite from said V-belt for retaining said weight against centrifugal action when said one of said pulley halves is in its position closest to the other of said pulley halves and said tension on said V-belt is increased from zero to a minimum before said centrifugal action pivots said weight, and said member being adaptable for releasing said weight when said tension is relieved and said centrifugal action is applied to said weight.

3. In an expansible pulley of the type including opposed pulley halves defining a groove therebetween for receiving a V-belt and with one of said pulley halves axially movable with respect to the other alternately to a position toward and to a position away from said other, the combination of a weight pivotally connected to said one of said pulley halves on the side thereof opposite said groove for radial movement in response to centrifugal force, a spring connected to said one of said pulley halves and to said weight for yieldingly urging the latter radially inwardly, means for retaining said one of said pulley halves in said position toward said other of said pulley halves when said weight is disposed radially inwardly and when said V-belt is under tension sufficient to axially urge said one of said pulley halves, said means also being operable for releasing said one of said pulley halves for movement away from said other when said tension on said V-belt is relieved.

4. An expansible pulley and V-belt combination comprising a shaft rotatably mounted, an axially movable pulley section and an axially fixed pulley section both mounted on said shaft for rotation therewith and having facing annular beveled portions defining a groove, a V-belt disposed in said groove, a weight pivotally attached to the side of said axially movable pulley section opposite from said groove and on a pivot axis disposed parallel to the shaft for pivotal movement radially of said shaft, a spring connected to said axially movable pulley section and to said weight for yieldingly urging the latter radially inwardly, a frusto-conical member concentrically mounted on said shaft in an axially fixed position adjacent said weight with the apex of said member toward said pulley and having a shoulder disposed to face said weight for the latter to abut said shoulder upon axial movement of said axially movable pulley section and with said movement induced by tension on said V-belt.

5. A pulley and V-belt combination comprising a shaft rotatably mounted, an axially fixed pulley section and an axially movable pulley section both mounted on said shaft for rotation therewith and forming a groove therebetween, a V-belt disposed in said groove, a weight pivotally attached to the side of said axially movable pulley section opposite said groove and having a pivot axis disposed parallel to said shaft for radially outward pivotal movement under the influence of centrifugal force, a spring connected between said axially movable pulley section and said weight for yieldingly urging the latter radially inwardly, a member mounted adjacent said weight and including a first surface for abutting said weight on the side thereof away from said groove to retain said weight in a radially inwardly first position in response to tension on said V-belt, and said member including a second surface inclined radially outwardly and axially away from said weight for abutting the latter when centrifugal force pivots said weight to a radially outwardly second position and said movable pulley section is moved axially in response to tension on said V-belt.

6. In an expansible pulley of the type operable with a V-belt and influenced by a centrifugal force weight, the combination of a rotatable shaft, a pair of pulley halves mounted on said shaft for rotation therewith and one of said pulley halves axially movable on said shaft with respect to the other of said pulley halves, said pulley halves including facing beveled surfaces for defining a V-shaped pulley groove therebetween with said V-belt received in said groove, a weight pivotally attached to said one of said pulley halves on the side thereof opposite said groove for pivotal movement radially outwardly with respect to said shaft in a plane parallel to said groove, a spring attached between said weight and said one of said pulley halves for pivotally urging said weight radially inwardly toward said shaft, a member on said shaft adjacent said weight for abutting the latter when tension in said V-belt axially moves said weight against said member to hold said weight radially inwardly with respect to said shaft and said member including an inclined surface for axially urging said one of said pulley halves toward said other of said pulley halves when said weight is radially outward and tension in said belt is relieved.

7. An expansible pulley and V-belt combination comprising a shaft rotatably mounted, an axially movable pulley section and an axially fixed pulley section both mounted on said shaft for rotation therewith and having facing annular beveled portions defining a groove, a V-belt disposed in said groove, a weight pivotally attached to the side of said axially movable pulley section opposite from said groove for pivotal movement in a plane parallel to said groove under the influence of centrifugal force, a spring connected to said axially movable pulley section and to said weight for yieldingly pivotally urging the latter radially inwardly with respect to said shaft, a frusto-conical member concentrically mounted on said shaft in an axially fixed but rotationally free position adjacent said weight with the apex of said member toward said pulley and having an annular shoulder disposed to face said weight for the latter to abut said shoulder upon axial movement of said axially movable pulley section and with said movement induced by tension on said V-belt all for retaining said weight radially inwardly against the action of centrifugal force.

8. In an expansible pulley for use in transmitting driving power from a throttle controlled vehicle engine to a vehicle wheel and said pulley being of the type operable with a V-belt and influenced by centrifugal force weights, the combination of a rotatable wheel axle, a pair of pulley halves mounted on said axle for rotation therewith and one of said pulley halves axially movable on said axle, said pulley halves including facing beveled surfaces for defining a V-shaped pulley groove therebetween with said V-belt received in said groove and disposed on a pulley on said vehicle engine, a weight pivotally attached to said one of said pulley halves on the side thereof opposite said groove for pivotal movement in a plane transverse to said axle and radially outwardly of said axle in response to centrifugal force operable upon rotation of said axle, a spring attached between said weight and said one of said pulley halves for urging said weight radially inwardly toward said axle, means adjacent said weight for retaining the latter radially inwardly with respect to said axle and against said centrifugal force when said throttle is open to create a sufficient tension on said V-belt to urge said one of said pulley halves axially, said means being disposed radially inwardly with respect to said pivotal movement of said weight and the latter arranged to pivot out of contact of said means upon said pivotal movement.

9. In an expansible pulley of the type operable with a V-belt and influenced by a centrifugal force weight, the combination of a rotatable shaft, a pair of pulley halves mounted on said shaft for rotation therewith and one of said pulley halves axially movable on said shaft, said pulley halves including facing beveled surfaces for defining a V-shaped pulley groove therebetween with said V-belt received in said groove, a weight pivotally attached to said one of said pulley halves on the side thereof opposite said groove for pivotal movement radially outwardly of said shaft upon rotation thereof, a member adjacent said weight and having a surface inclined radially outwardly from said weight, a spring attached between said one of said pulley halves and said weight for urging said weight radially inwardly toward said shaft and against said surface when said weight is pivoted radially outwardly by centrifugal force and said one of said pulley halves is moved axially.

10. An expansible pulley and V-belt combination comprising a shaft rotatably mounted, an axially movable pulley section and an axially fixed pulley section both mounted on said shaft for rotation therewith and having facing annular beveled surfaces defining a groove, a V-belt disposed in said groove, a frusto-conical member concentrically mounted on said shaft adjacent said axially movable pulley section on the side thereof opposite said groove and with the apex of said member disposed toward said pulley, a weight pivotally attached to said side of said axially movable pulley section for pivotal movement in a plane transverse to said shaft under the influence of centrifugal force and said weight movable along said member whan said axially movable pulley section is moved axially, a spring attached between said axially movable pulley section and said weight for urging the latter radially inwardly against said member to urge said axially movable pulley section against said V-belt.

11. A pulley and V-belt combination comprising a first pulley of the centrifugal force operated type which normally increases its effective diameter with an increase in R. P. M. and said first pulley having a V-groove, a rotatable shaft mounted parallel to the axis of said first pulley, a second pulley comprising a pair of pulley halves mounted on said shaft for rotation therewith and one of said pulley halves axially movable on said shaft, said pulley halves including facing beveled surfaces for defining a pulley V-groove therebetween, a V-belt received in said V-grooves of said pulleys for transmitting forces between said pulleys, a weight pivotally attached to said one of said pulley halves on the side thereof opposite said groove for pivotal movement radially outwardly of said shaft upon rotation thereof, a member adjacent said weight and having a surface inclined radially outwardly from said weight, a spring attached between said one of said pulley halves and said weight for urging said weight radially inwardly toward said shaft and against said surface when said weight is pivoted radially outwardly by centrifugal force and said one of said pulley halves is moved axially.

References Cited in the file of this patent

UNITED STATES PATENTS

| | | |
|---|---|---|
| 2,512,816 | Sweger | June 27, 1950 |
| 2,533,197 | Pinkvoss | Dec. 5, 1950 |
| 2,534,409 | Bray | Dec. 19, 1950 |
| 2,585,732 | Braman | Feb. 12, 1952 |

FOREIGN PATENTS

| | | |
|---|---|---|
| 1,087,907 | France | Sept. 1, 1954 |